United States Patent Office 3,315,400
Patented Apr. 25, 1967

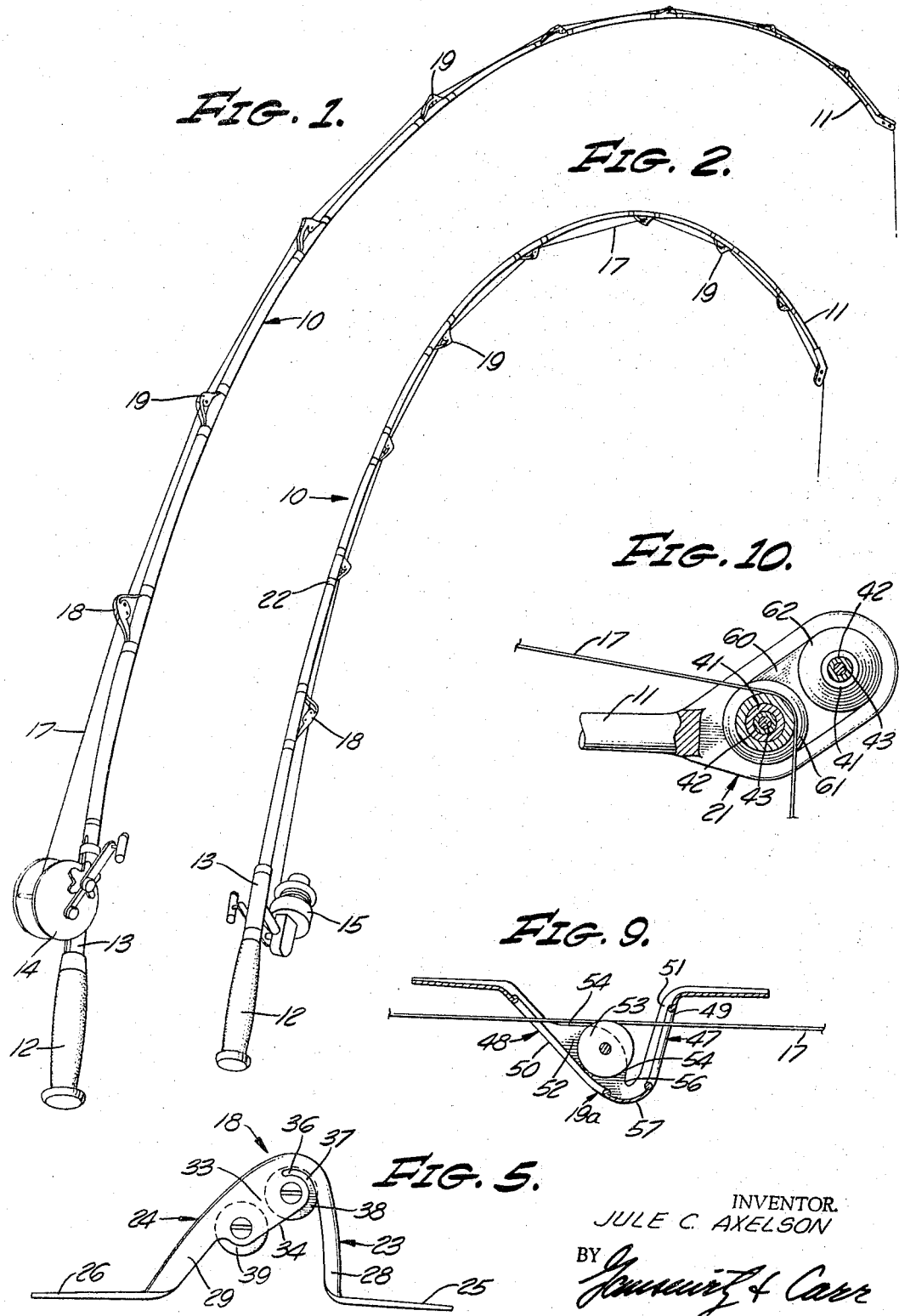

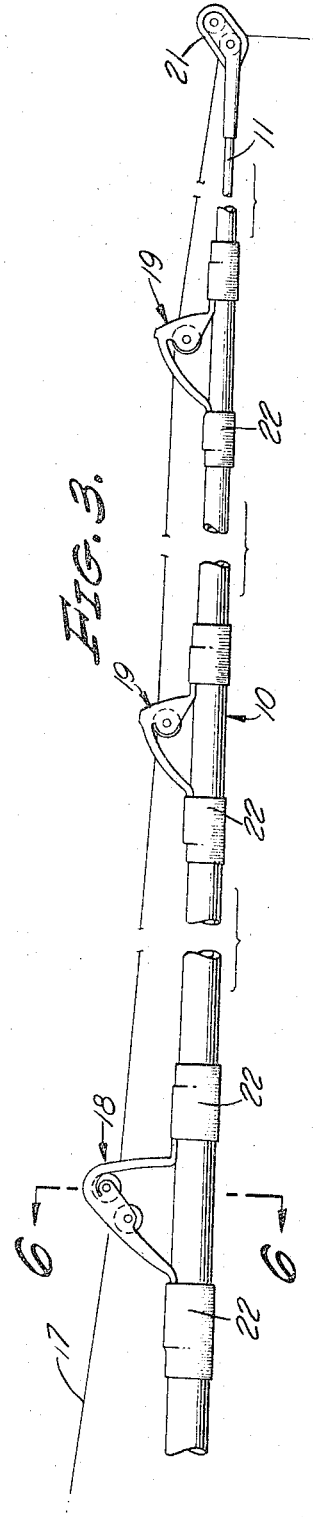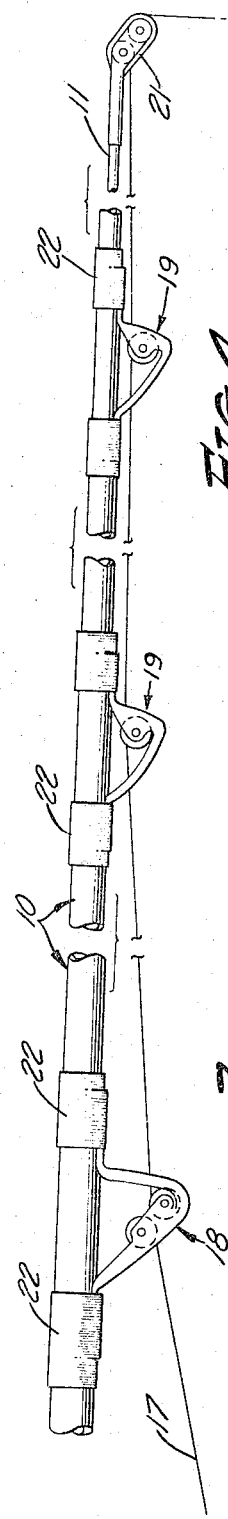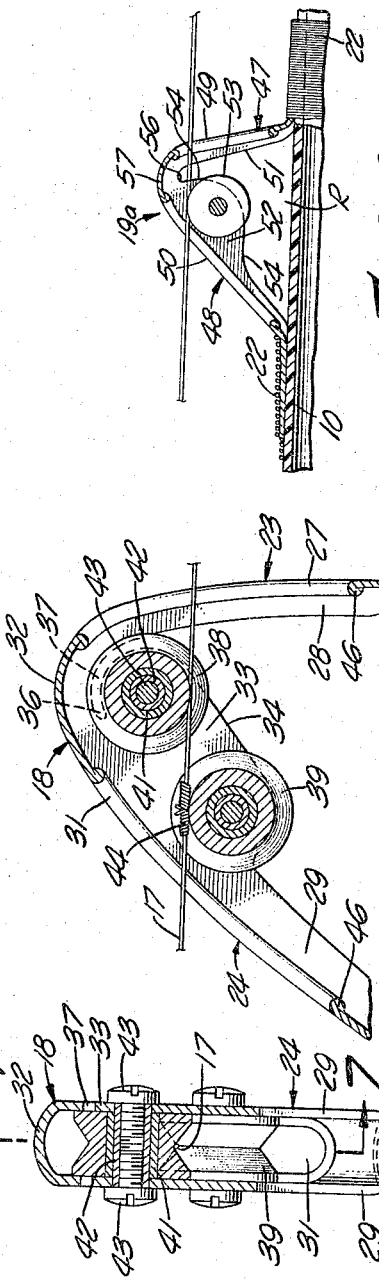

3,315,400
FISHING ROD FOR CONVENTIONAL FISHING AND SPIN FISHING, AND NON-FOULING LINE GUIDES INCORPORATED THEREIN
Jule C. Axelson, Newport Beach, Calif., assignor to Axelson Fishing Tackle Mfg. Co., Newport Beach, Calif., a corporation of California
Filed Nov. 13, 1964, Ser. No. 410,954
15 Claims. (Cl. 43—24)

This invention relates to a fishing rod incorporating roller-type line guides which are so constructed that the rod may be employed equally well for either conventional fishing or spin fishing. In addition, the invention relates to the double-roller and single-roller line guides incorporated in such rod, which line guides are characterized by non-fouling and substantially frictionless operation at all times.

The popularity of roller-type line guides for fishing rods has increased greatly in recent years, one important reason being that roller guides permit the landing of much larger fish, for a given line size, than do guides which are devoid of rollers. It will be apparent that roller guides, if they are to operate satisfactorily must be so constructed that they will never impede the playing-out or reeling-in of the fish line. Stated otherwise, the guides must be non-fouling. Conventional roller-type line guides, if they are so constructed as to avoid other major deficiencies to be outlined below, tend to foul for at least one of two reasons:

(1) The fish line loops over the side of the mounting for the roller, so that a very substantial dragging action results.

(2) The knots which are employed by fishermen are frequently so large that they catch between the rollers of double-roller guides.

It is, therefore, a major object of the present invention to provide a fishing rod, and line guides incorporated therein, which prevent fouling of the line despite repeated changes between slack-line condition and taut-line condition, and despite the presence of relatively large fisherman's knots in the line.

The popularity of spin fishing has also increased greatly over the past several decades, making it highly desirable and important that any roller guide be equally usable for both spin fishing and conventional fishing. Many fishermen switch back and forth between spin fishing and conventional fishing, and do not desire to change rods with each change in the type of reel employed. Furthermore, reels have been devised which change back and forth between the conventional mode of fishing and spin fishing, such reels being useless when employed on rods which are not likewise convertible. Another major reason why line guides should be usable for both spin fishing and conventional fishing is that major production economies are obtained, and inventory requirements reduced, when a single rod will satisfy fisherman having preference for one or the other of the types of fishing.

Another object of the present invention is, therefore, to provide a fishing rod, and line guides incorporated thereon, which are equally satisfactory for use relative to conventional fishing and spin fishing, yet which do not result in a sacrifice of any of the advantages inherent in prior-art roller-type guides adapted for one or the other of the two modes of fishing.

A further major factor relative to roller-type line guides is that the line must stay in operative contact with at least one roller at substantially all times. If the line frequently leaves contact with the roller, and instead rubs against a portion of the frame, the amount of friction and drag will change substantially, and wear on the line will be increased accordingly. The rubbing of the line against the frame has, in the past, occurred most often relative to double-roller guides of the type in which the axes of the two rollers are spaced along a perpendicular to the adjacent portion of the rod. Such axes must, in order to permit passage of the knots between the rollers, be spaced relatively far apart. Because the line frequently moves back and forth between the two rollers, it will be understood that the line when between the two spaced rollers frequently rubs against the frame.

In view of the above, it is an additional important object of the invention to provide a double-roller line guide which will pass relatively large knots between the rollers, but which does not permit the line to rub against the frame and thus create adverse frictional and wear characteristics.

Another factor of major importance is the ability to achieve all of the above-indicated advantages with a line guide having an integral metal frame. Although the present invention is not limited to roller-type line guides having integral metal frames, but instead comprehends plastic frames, plastic and metal frames, and multi-component metal or plastic frames, it is emphasized that (particularly for heavy ocean tackle) the ability to achieve the specified advantages with integral metal frames is of major importance.

It is, therefore, a further object of the present invention to provide an integral metal frame which is readily mass produced, which is extremely strong, and which is aesthetically pleasing, yet which operates in such manner and in conjunction with the associated roller or rollers that all of the above-specified advantages are achieved.

These and other objects will become apparent from the following detailed description taken in connection with the accompanying drawings in which:

FIGURE 1 is a perspective view illustrating the present fishing rod as utilized with a conventional reel for conventional fishing, the rod being shown in flexed condition;

FIGURE 2 is a view corresponding to FIGURE 1 but illustrating the rod as employed with a spin-fishing reel for spin fishing;

FIGURE 3 is a fragmentary side-elevational view illustrating portions of the showing of FIGURE 1, and illustrating the line guides in much greater detail;

FIGURE 4 is a view similar to FIGURE 3 but illustrating portions of the showing of FIGURE 2;

FIGURE 5 is a side elevational view of the double-roller line guide which is provided on the fishing rod relatively adjacent the reel seat;

FIGURE 6 is an enlarged transverse sectional view taken on line 6—6 of FIGURE 3;

FIGURE 7 is a fragmentary longitudinal sectional view on line 7—7 of FIGURE 6;

FIGURE 8 is a view corresponding generally to FIGURE 7 but illustrating a single-roller line guide;

FIGURE 9 is a longitudinal sectional view of the single-roller line guide as employed during use of the rod for spin fishing; and FIGURE 10 is a longitudinal sectional view illustrating the "tip top" (roller assembly at the tip of the rod) during use of the rod for conventional fishing.

Referring to FIGURES 1 and 2, the fishing rod is illustrated to comprise a tapered shaft 10 which is commonly formed of fiberglass and synthetic bonding resin, such shaft having a tip portion 11 at the small-diameter end, and having a butt or handle portion 12 at the large-diameter end. Provided adjacent the butt 12 is a reel seat 13 adapted to mount either a conventional reel 14 (FIGURE 1) or a spin-fishing reel 15 (FIGURE 2).

The line 17 which is wound on either of the reels 14 and 15 extends first through a double-roller line guide 18 which is mounted on the shaft portion relatively adjacent reel seat 13. The double-roller guide is necessary because the action of either of the reels is such as to vary the angle between the adjacent line portion (between the guide 18 and the reel seat) and the corresponding portion of shaft 10. Mounted at spaced points longitudinally of the remaining portion of the shaft are single-roller line guides 19, the distance separating such rollers from each other and from the double-roller guide 18 being such that the line will not rub against the shaft regardless of the flexed condition of the latter. At the extreme end or tip of shaft portion 11 is the roller tip line guide 21. The roller tip line guide is also of the double-roller variety, in order to permit use of the rod for both conventional fishing and spin fishing.

DETAILED DESCRIPTION OF DOUBLE-ROLLER LINE GUIDE

Proceeding next to a detailed description of the double-roller line guide 18, this is best illustrated in FIGURES 5–7 to comprise an integral metal frame which is secured, as by windings indicated at 22, to the surface of shaft 10. Stated more definitely, the frame has a main body comprising a front portion 23 (normally mounted relatively facing the tip of the rod), and a rear portion 24 (normally mounted relatively facing the reel seat). Feet 25 and 26 are formed integrally, respectively, with the front and rear portions of the frame body, being bound to shaft 10 by the windings 22.

It is to be noted that feet 25 and 26 lie generally in a single plane, and that the frame body is disposed on only one side of such plane.

The front portion 23 of the frame body is shown as extending generally perpendicularly away from the adjacent portion of shaft 10, but as curving somewhat to the left as viewed in FIGURE 5. Such front portion has a web provided with an elongated line-receiving opening 27, and also has a flange 28 at each edge of the web. The flanges 28 are generally parallel to each other, the result being that the front portion 23 is generally channel-shaped in cross section.

The rear portion 24 of the frame body is illustrated as being substantially inclined relative to the adjacent shaft portion, for example at the indicated forty-five degree (approximately) angle. Such rear portion also has a web at the edges of which are provided parallel flanges 29. The web of rear portion 24 is, similarly to the web of portion 23, provided with an elongated opening 31 which is adapted to receive the line 17. Thus, a bridge portion 32 (FIGURE 7) is formed at the upper-central region of the frame, where the webs of portions 23 and 24 meet.

It is a very important feature of the present line guide that extensions are formed on one of the sets of flanges 28 and 29, preferably the latter and as illustrated in FIGURE 7. Such extensions (ears or lugs) are denoted by the reference numeral 33 and are substantially co-planar (respectively) with flanges 29. The extensions serve as mounting means for the two rollers to be described below, and also serve the very important function of insuring that line 17 can never loop over a portion of the frame and thus become fouled.

Each of the extensions 33 has an edge 34 the central part of which is generally parallel to the web of rear portion 24, such edge curving at its lower end and merging with the adjacent region of the flange 29 with which it is integral. At its upper end, the edge 34 is generally arcuate about the axis of the upper roller, the extent of the arc being substantially greater than ninety degrees. Thus, such edge meets the flange edge (or edges) at a region beneath bridge 32, namely at a junction 36 located substantially nearer to the opening 31 than is the axis of the upper roller. The resulting curved slots or gaps (formed between the described edges of the flanges and extensions) are indicated at 37, and perform the function of making it possible to form the metal frame of the line guide in an integral manner, without kinks. As will be described subsequently, such arcuate slots or gaps 37 do not in any way permit the line to foul therein, one important reason being because of the location of the upper roller as will be stated hereinafter.

Upper and lower grooved rollers or sheaves 38 and 39 are mounted within the frame of the line guide, between the extensions 33. The mounting of each roller is preferably effected as described in detail in Patent No. 3,091,201, issued May 28, 1963, for Method of Making Roller Guides, and in Patent No. 3,006,009, issued Oct. 31, 1961, for Roller Tip for Fishing Rods, and Method of Making the Same. Thus, each roller mounting means includes a combination spacer and bushing 41, an axle pin 42, and screws 43 which are threaded into the pin to maintain the extensions 33 pressed tightly against the ends of the spacer-bushing. The length of the element 41 is greater than the thickness of each roller 38 and 39, thereby providing sufficient clearance to permit each roller to rotate freely about its axis.

It is an important feature of the invention that the rollers are mounted in spaced relationship relative to each other, along a line oblique to and intersecting the adjacent portion of tapered shaft 10. The angle may be, for example, on the order of thirty-five to fifty-five degrees relative to the shaft axis (and relative to the above-mentioned plane containing feet 25 and 26). The precise angle is selected, relative to the spacing between the rollers, in such manner that the lower region of the bottom of the groove in upper roller 38 will be at substantially the same elevation (when the shaft 10 is horizontal) as the upper region of the bottom of the groove in the lower roller, so that the line 17 (when taut) will be simultaneously tangent to both rollers as shown in FIGURE 7. It will thus be observed that the line is constrained against upward and downward movement through any substantial distance, upward movement being prevented by the upper roller and downward movement being prevented by the lower roller. However, the line may be shifted off the lower roller due to operation of the adjacent reel 14 or 15.

The described action is to be contrasted with that which would occur if the rollers were spaced along a line perpendicular to the adjacent portion of the shaft. Because of the necessary clearance between the rollers, there would then be a substantial period of time (when the line is located between the rollers) during which the line would tend to rub against the frame sides, as distinguished from riding on the rollers. Such rubbing would result in substantial drag and wear. Because of the present construction, on the other hand, the line is in substantially frictionless engagement with at least one of the rollers at all times.

The distance between the rollers is determined by the size of fisherman's knots normally made in the line 17. Such distance and the size of frame openings 27 and 31 are correlated to each other, in such manner that the knot will pass through the frame openings and also between the rollers. When moving between the rollers, a large knot follows a snaking or sinuous path. The indicated knot 44 (FIGURE 7) will obviously pass between the rollers without difficulty.

The diameter of upper roller 38 is sufficiently large that the peripheral portions of the sides of such roller completely overlap and cover the arcuate slots or gaps 37, such sides being parallel to each other and perpendicular to the axis of the roller. Stated otherwise, the peripheral portion of the upper roller is nested between the flanges of portions 23 and 24, adjacent the slots 37. It follows that the upper roller positively eliminates any possibility that the line may enter an arcuate slot 37 and foul therein.

The openings 27 and 31 in the front and rear portions are sufficiently long that the line 17 may never, during use of the line guides on shaft 10 and during normal fishing operations, rub against the frame at points adjacent the end portions of the openings. The openings are sufficiently wide, as previously stated, that knots normally formed in line 17 may pass readily therethrough. The frame portions adjacent the openings are provided with rolled beads 46 to reduce wear during momentary contact between such beaded edges and the line 17. As best shown in FIGURE 6, such beaded portions (edges) are disposed closer to each other than are the opposed flanges 28 or 29. Thus, the beaded edges tend to center the line 17 relative to the rollers, so that the line will remain in the grooved portions of the rollers. It is to be understood that the width (horizontal dimension) of opening 27 is the same as that of the opening 31 which is illustrated in FIGURE 6.

DETAILED DESCRIPTION OF SINGLE-ROLLER LINE GUIDE

The single-roller guides 19 shown in FIGURES 1-4 have rollers which are mounted on relatively steeply-inclined frame portions. The rollers may also be mounted on relatively gently-inclined frame portions. Thus, the single-roller guides to be described in detail hereinafter have the rollers thereof mounted on the gently-inclined frame portions. The latter single-roller guides are numbered 19a in FIGURES 8 and 9.

The single-roller line guides 19a are substantially identical to each other, except that the sizes thereof reduce progressively as the tip portion 11 of the shaft is approached.

Similarly to the double-roller guide 18, each single-roller guide 19a (FIGURES 8 and 9) has a body the steeply-inclined front portion of which is numbered 47, and the gently-inclined rear portion of which is numbered 48. Such portions have webs provided with large line-receiving openings which are indicated at 49 and 50. In addition, such frame portions incorporate flanges, so that generally channel-shaped configurations result. The flanges on the front frame portion are indicated at 51, being shown as relatively narrow. Conversely, the flanges 52 on the rear frame portion are extended in order to provide mounting means for the roller 53 which is mounted therebetween as in the case of each of the rollers of double-roller guide 18.

Stated more definitely, each of the flanges 52 projects forwardly from the associated rear frame portion 48, having an edge 54 which extends forwardly and parallel to the adjacent shaft portion, and then curves forwardly and away from the shaft to a point above (FIGURE 8) the forward region of roller 53. The junction thus formed between each edge 54 and the rear end of each flange 51 is indicated at 56.

It is an important feature of the single-roller guide that the edges (forming a gap) adjacent junction 56 do not curve rearwardly and downwardly (FIGURE 8) toward the shaft, as in the case of the double-roller guide, and do not extend rearwardly past a vertical line (perpendicular to the shaft) containing the axis of roller 53. Instead, the junction 56 is disposed substantially forwardly of, and above (FIGURE 8), the axis of the roller 53. Accordingly, and even if the line forms a loop when in slack condition, subsequent tightening of the line cannot result in fouling thereof on any portion of the frame. Stated otherwise, any loop that forms is immediately removed when the line tightens.

The bridge 57 which is formed above roller 53 is substantially narrower than the bridge 32 of the double-roller guide, because of the fact that the openings 49 and 50 extend upwardly (FIGURE 8) for a considerably greater distance than in the double-roller guide. This permits the line 17 to be threaded through openings 49 and 50 remote from the shaft, as shown in FIGURE 8 and when conventional fishing is to be performed, or adjacent the shaft as shown in FIGURE 9 relative to spin-fishing operations.

Except as stated above, the openings 49 and 50 correspond generally to openings 27 and 31, being provided with beads corresponding to beads 46 of the previous embodiment. Similarly, the frame is provided with feet corresponding to the feet 25 and 26 and which are attached to the shaft by means of the windings 22 or other suitable means.

It is a major feature of the double-roller and single-roller guides that the rollers may be removed, for purposes of cleaning and oiling, while the guides are mounted on the rods. Thus, for example, the roller 53 (FIGURE 8) may be removed through space R, by merely unthreading the associated screws and withdrawing pins 42.

DESCRIPTION OF ROLLER TIP LINE GUIDE 21

The roller tip line guide 21 is suitably attached to the end of the tip portion 11 of shaft 10, having two obliquely-outwardly extending side portions 60 the edges of which are suitably beaded or rounded. First and second rollers 61 and 62 are mounted between such side portions 60 by means of suitable mounting assemblies as described relative to FIGURES 6 and 7 and in the above-cited patents. The rollers 61 and 62 are spaced from each other a distance sufficient to pass knots therethrough, as stated relative to the double-roller guide. The axes of the rollers are disposed along a line which intersects the axis of tip portion 11 at an obtuse angle, for example on the order of one hundred thirty or one hundred forty degrees.

With the described construction, the lower roller 61 (FIGURE 10) operates during conventional fishing, whereas the upper roller 62 operates during spin fishing. It is emphasized that the operation of the rollers 61 and 62 relative to line 17 is distinctly different than the operation of the rollers of the double-roller guide shown in FIGURES 5-7, the reason being that the line 17 turns an abrupt corner as it leaves the roller tip line guide, instead of continuing parallel to the shaft as is the case relative to the double-roller guide.

OPERATION

Let it first be assumed that conventional fishing is to be performed. The fisherman mounts a conventional reel 14 (FIGURE 1) on the reel seat 13, and threads the line 17 between rollers 38 and 39 of the double-roller guide 18. He then threads the line above (remote from the shaft 10) each of the single rollers 53 of the single-roller guides 19, as shown in FIGURE 8. Thereafter, the line is threaded between the two rollers 61 and 62 of the roller tip line guide 21, as illustrated in FIGURE 10.

The rod assembly is then employed in the conventional manner, with the reel 14 held uppermost. As described above in detail, it is impossible to foul the line 16 in any of the guides, despite the presence of relatively large knots in the line, and despite the changing of line tension from slack condition to taut condition. Furthermore, also as described above in detail, the line remains in operative, substantially-frictionless engagement with the rollers, and does not rub against the frame sides.

When the rod assembly is employed for spin fishing, a spin-fishing reel 15 is mounted on the reel seat 13 as shown in FIGURE 2, following which the line 17 is again threaded between the two rollers 38 and 39 of the double-roller guide. Thereafter, and as shown in FIGURE 9, the line is threaded between shaft 10 and the roller 53 of each single-roller guide 19a. The line is then inserted between the two rollers of the roller tip line guide, being in operative engagement primarily with the outer roller 62.

It will thus be understood that the rod is completely convertible from spin-fishing operations to conventional-fishing operations.

The phrase "conventional fishing," as employed herein, denotes all types of fishing (including casting, trolling, bottom fishing, etc.) wherein the reel and the line guides are disposed on the upper side of the rod when the rod is held by the angler. Conversely, the expression "spin fishing" denotes all types of fishing wherein the reel and line guides are disposed beneath the rod when thus held. Conventional fishing is normally accomplished by means of a reel such as the one illustrated at 14, having an axis which is perpendicular to the axis of the reel seat. Conversely, spin fishing is normally performed with a reel such as is indicated at 15, the axis being generally parallel to that of the reel seat.

In the present specification, and in the appended claims, reference to the absence of looping of the line (for example over the mounting for the roller means) denotes such absence when the line is taut and is substantially parallel to the rod. It will be understood that the presence of a loop during a slack-line period, for example, is not harmful if the loop is eliminated automatically as the line becomes taut.

The foregoing detailed description is to be clearly understood as given by way of illustration and example only, the spirit and scope of this invention being limited solely by the appended claims.

I claim:

1. A non-fouling double-roller line guide adapted to be mounted on the shaft of a fishing rod in spaced relationship from the tip thereof, which comprises:
    a frame having a body portion and having first and second feet connected to said body portion and lying generally in a single plane,
        said body portion lying on only one side of said plane containing said feet whereby said frame may be secured to one side of a portion of the shaft of a fishing rod and in spaced relationship from the tip thereof, and
    first and second grooved rollers mounted to mounting portions of said frame and spaced sufficiently far from each other that knots present in said fishing line may pass therebetween,
        the axes of said rollers being spaced along a line oblique to said shaft portion whereby said rollers are vertically offset and are also offset longitudinally of said shaft portion,
        said frame having openings therethrough adapted to receive a fishing line when said line is threaded between said rollers,
        said mounting portions being shaped to prevent fouling of any portion of said fishing line when said fishing line is threaded between said rollers and through said openings.

2. The invention as claimed in claim 1, in which the spacing of said rollers from said plane, and the angle of said oblique line, are such that said fishing line is simultaneously substantially tangent to both of said rollers when said fishing line is thus threaded and is parallel to said shaft portion.

3. A non-fouling double-roller line guide, which comprises:
    an integral metal body having a front portion and a rear portion,
    first and second feet formed integrally, respectively, with said front and rear body portions,
        said feet lying generally in a single plane,
        said body lying on one side only of said single plane,
        said front body portion extending generally perpendicularly to said plane,
        said rear body portion being inclined at an acute angle relative to said plane,
        said front and rear body portions being connected at a bridge portion remote from said plane,
        said front and rear body portions each being generally channel-shaped and having a line-receiving opening in the web thereof,
            the flanges of said channel-shaped body portions extending toward said plane,
    roller-mounting side elements provided integrally on said flanges of said rear body portion for mounting of first and second rollers between said flanges,
        said side elements having curved edge portions located remote from said plane and being disposed adjacent correspondingly curved edges of said flanges in the vicinity of said bridge portion of said body,
            said curved edge portions and said adjacent edges of said flanges forming therebetween arcuate slots or gaps, and
    first and second rollers mounted between said side elements and adapted to receive between them a line extended through said openings in said front and rear portions,
        the axes of said rollers being disposed along a line which is generally parallel to said rear body portion whereby said rollers are offest both in a direction perpendicular to said plane and in a direction parallel to a fishing rod shaft on which said feet are adapted to seat,
        said rollers being spaced apart sufficiently to receive between them knots formed in said fishing line,
        the roller most remote from said plane being sufficiently large that the peripheral portion thereof is disposed between said flanges and completely covers said arcuate slots or gaps whereby to aid in preventing fouling of said line in said arcuate slots or gaps.

4. A single-roller non-fouling line guide for mounting on a portion of a fishing rod shaft in spaced relationship from the tip of the shaft, which comprises:
    an integral metal body having a front portion and a rear portion,
    first and second feet formed, respectively, integrally with said front and rear body portions,
        said feet lying generally in a single plane,
        said body being disposed on only one side of said plane,
        each of said front and rear body portions being generally channel-shaped and having a line-receiving opening in the web of the channel,
        the flanges of said front body portion being formed with extensions having lower edges which incline upwardly from said first foot toward said rear portion,
            said edges thereafter curving in a direction away from said plane and from said second foot to junctions with the ends of the flanges of said rear portion which are remote from said plane, and
    a roller mounted between said flange extensions and adapted to receive a fishing line extended through said openings,
        the portion of said roller remote from said plane being adjacent said junctions, whereby said line may not loop over said flange extensions and thereby foul.

5. The invention as claimed in claim 4, in which said openings in said front and rear body portions are vertically elongated sufficiently far that said line may be threaded selectively between said roller and said plane when it is desired to employ the line guide for spin-fishing operations, and between said roller and a bridge formed at the junction between said front and rear body portions when it is desired to use the line guide for conventional-fishing operations.

6. A fishing rod which is fully convertible for use in both spin-fishing and conventional fishing operations, which comprises:
   an elongated tapered flexible shaft having a tip portion at the small-diameter end thereof and having a butt or handle at the large-diameter end thereof,
   a reel seat provided adjacent said butt,
   a double-roller line guide mounted on said shaft in spaced relationship from said reel seat,
      said double-roller line guide comprising a frame and first and second rollers mounted rotatably in spaced relationship from each other along a line intersecting said shaft and oblique thereto,
         said frame being provided with roller-mounting means shaped and disposed to prevent looping of the fishing line around said rollers and around said roller-mounting means,
   a plurality of single-roller line guides provided at spaced points along said shaft between said double-roller line guide and said tip,
      each of said single-roller line guides comprising a frame and a roller so related that said line may not loop around said roller or any portion of said frame,
         said latter frame being provided with openings sufficiently elongated in a direction transverse to said shaft that the fishing line may be selectively threaded between said roller and said shaft, and between said roller and a bridge portion of said frame remote from said shaft, and
   a roller tip line guide mounted on said tip portion of said shaft,
      said roller tip line guide including first and second rollers adapted to receive said line therebetween.

7. A non-fouling anti-friction line guide adapted to be mounted on the shaft of a fishing rod in spaced relationship from the tip thereof, which comprises:
   an integral metal frame having a body and first and second feet connected thereto for securing of said body to the shaft of a fishing rod in spaced relationship from the tip thereof,
      said body having front and rear portions which extend upwardly from said feet and connect to each other at a bridge portion remote from said feet,
         one of said body portions being relatively steeply inclined from said shaft,
         the other of said body portions being relatively gently inclined therefrom,
      each of said front and rear body portions being generally channel-shaped and having an elongated opening in the web thereof for reception of a fishing line,
      each of said front and rear body portions having flanges extending from said web generally toward said feet,
      the flanges on only said other of said front and rear body portions having roller-mounting portions adapted to mount at least one roller therebetween,
         said roller-mounting portions having edges which meet the ends of the flanges on the said one said body portions at junction regions located adjacent said bridge portion of said body,
         said roller-mounting portions being so shaped that a fishing line extending through said openings in said front and rear body portions may not loop over said roller-mounting portions and thereby foul, and
   roller means mounted between said roller-mounting portions and disposed for rolling support of said fishing line when said fishing line is threaded through said openings.

8. The invention as claimed in claim 7, in which said roller means comprises a single roller, in which the axis of said roller intersects an imaginary line which is perpendicular to a plane containing said feet, and in which said junction regions are located between said imaginary line and said one body portion.

9. A single-roller non-fouling line guide for mounting on a portion of a fishing rod shaft in spaced relationship from the tip of the shaft, which comprises:
   a body having a front portion and a rear portion,
   first and second feet formed, respectively, on said front and rear body portions,
      said feet lying generally in a single plane,
      said body being disposed on only one side of said plane,
      each of said front and rear body portions being generally channel-shaped and having a fishing line-receiving opening in the web of the channel,
      the flanges of said rear body portion being formed with extensions having edges which incline away from said plane from a region relatively adjacent said second foot toward said front body portion,
         said edges thereafter curving in a direction away from said plane and away from said first foot to junctions with the ends of the flanges of said front body portion which are remote from said plane, and
   a roller mounted between said flange extensions and adapted to receive a fishing line extended through said openings,
      the axis of said roller being generally parallel to said plane and transverse to said body,
      said axis intersecting an imaginary line which is perpendicular to said plane,
      said junctions being located between said imaginary line and said front body portion.

10. The invention as claimed in claim 9, in which the radius of said roller is much smaller than the radius of curvature of each of said edges of said flange extensions.

11. The invention as claimed in claim 9, in which said front body portion is relatively steeply inclined relative to said plane, and in which said rear body portion is relatively gently inclined relative thereto.

12. The invention as claimed in claim 11, in which said front body portion is devoid of roller-mounting means.

13. The invention as claimed in claim 9, in which said fishing line-receiving openings in said front and rear body portions are sufficiently elongated that a fishing line may pass, when in taut condition, either between said roller and said plane, or on the opposite side of said roller from said plane, without contacting said body.

14. A single-roller non-fouling line guide for mounting on a portion of a fishing rod shaft in spaced relationship from the tip of the shaft, which comprises:
   a body having a front portion and a rear portion,
      said front and rear body portions being generally angularly related to each other and joining each other at a bridge region,
   roller-mounting means provided on one of said body portions, the other of said body portions being devoid of roller-mounting means, a roller mounted in said roller-mounting means, and first and second line-receiving slots formed, respectively, in said front and rear body portions for reception of a fishing line, each of said slots being sufficiently long that said fishing line, when in taut condition and engaged tangentially with either the region of said roller nearest said shaft portion or the region of said roller farthest therefrom, may extend parallel to said shaft portion without contacting either of said body portions.

15. The invention as claimed in claim 4, in which the axis of said roller passes adjacent a line which is perpendicular to said plane and extends adjacent said junctions.

References Cited by the Examiner

UNITED STATES PATENTS

| | | | |
|---|---|---|---|
| 801,884 | 10/1905 | Kunze et al. | 43—24 |
| 2,231,053 | 2/1941 | Byrd | 43—24 |
| 2,878,608 | 3/1959 | O'Brien | 43—24 |
| 3,165,856 | 1/1965 | Gourley | 43—24 |

FOREIGN PATENTS

| | | |
|---|---|---|
| 17,087 | 1895 | Great Britain. |

SAMUEL KOREN, *Primary Examiner.*

D. J. LEACH, *Assistant Examiner.*